United States Patent [19]

Berteau

[11] Patent Number: 5,330,343
[45] Date of Patent: Jul. 19, 1994

[54] VARIABLE-SHAPE MOLD

[75] Inventor: Jacques Berteau, Calixa-Lavallée, Canada

[73] Assignee: Autocontrole Inc., Montreal, Canada

[21] Appl. No.: 973,960

[22] Filed: Nov. 10, 1992

[51] Int. Cl.⁵ .................................................. B28B 7/02
[52] U.S. Cl. ........................................ 425/175; 249/155; 249/161; 264/219; 425/195
[58] Field of Search .............. 249/155, 158, 161; 264/219; 425/175, 195

[56] References Cited

U.S. PATENT DOCUMENTS

| | | | |
|---|---|---|---|
| 595,274 | 12/1897 | Soper . | |
| 1,458,847 | 6/1923 | Pipping | 249/158 |
| 1,501,246 | 7/1924 | Soderberg . | |
| 2,310,830 | 2/1943 | Blair et al. | 249/155 |
| 2,410,888 | 11/1946 | Lucy | 249/155 |
| 2,441,747 | 5/1948 | Beshgetoor | 76/107 |
| 2,442,022 | 5/1948 | Schulz | 101/401.2 |
| 2,968,838 | 1/1961 | Hicks . | |
| 3,363,875 | 1/1968 | Hedgewick et al. | 249/117 |
| 3,431,601 | 3/1969 | Lipscomb . | |
| 3,443,281 | 5/1969 | Walby . | |
| 3,596,869 | 8/1971 | Humphrey | 249/155 |
| 3,599,471 | 8/1971 | Whitacre | 72/414 |
| 3,818,218 | 6/1974 | Heenan et al. | 240/41.3 |
| 4,342,549 | 8/1982 | Lemelson | 425/150 |
| 4,390,491 | 6/1983 | Woodall | 425/175 |
| 4,731,144 | 3/1988 | Kommineni et al. | 249/155 |
| 4,890,995 | 1/1990 | Gray | 425/144 |
| 5,046,386 | 9/1991 | Frizot | 81/57.38 |
| 5,151,277 | 9/1992 | Bernardon et al. | 249/155 |
| 5,192,560 | 3/1993 | Umetsu et al. | 249/155 |

FOREIGN PATENT DOCUMENTS 156617 5/1954 Australia .
938173 12/1973 Canada .

Primary Examiner—Charles S. Bushey
Attorney, Agent, or Firm—Merchant & Gould, Smith, Edell, Welter & Schmidt

[57] ABSTRACT

The device for forming a variable-shape mold surface includes a plurality of cylindrical and helically threaded rods each having a mold surface defining end. These rods are assembled into a bundle of laterally adjacent rods in which (a) the helical thread of each rod is engaged with the helical threads of the adjacent rods, (b) each rod is rotatable about its longitudinal axis, and (c) the mold surface defining ends of the rods define the variable-shape mold surface. Upon rotation, the thread of one helically threaded rod slides on the threads of the adjacent rods to impart longitudinal movement to this rod relative to the adjacent rods and therefore axial movement of the mold surface defining end of this rod, to thereby modify the configuration of the variable-shape mold surface. Each rod has a second end shaped for engagement thereof with a digitally controlled rod rotating tool.

13 Claims, 2 Drawing Sheets

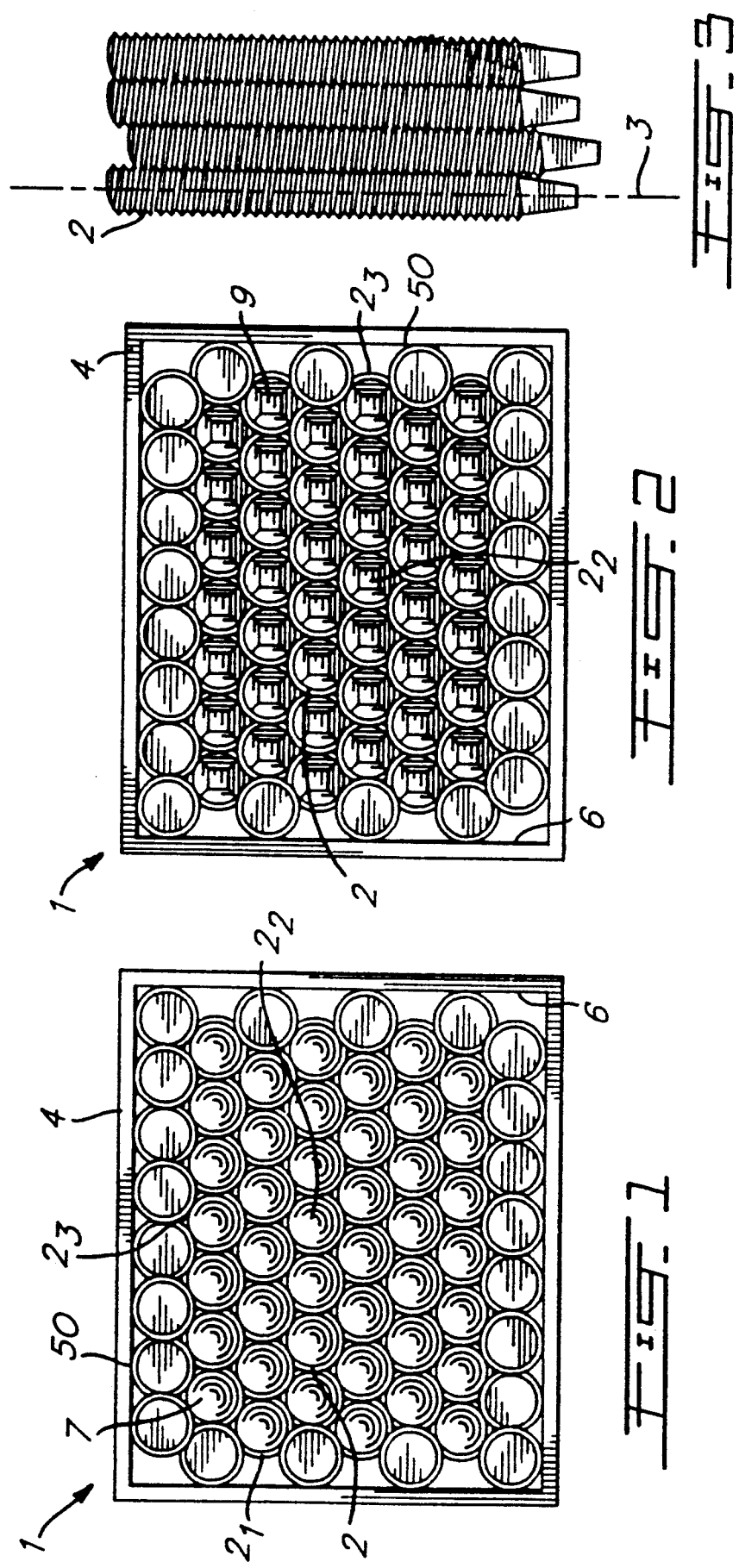

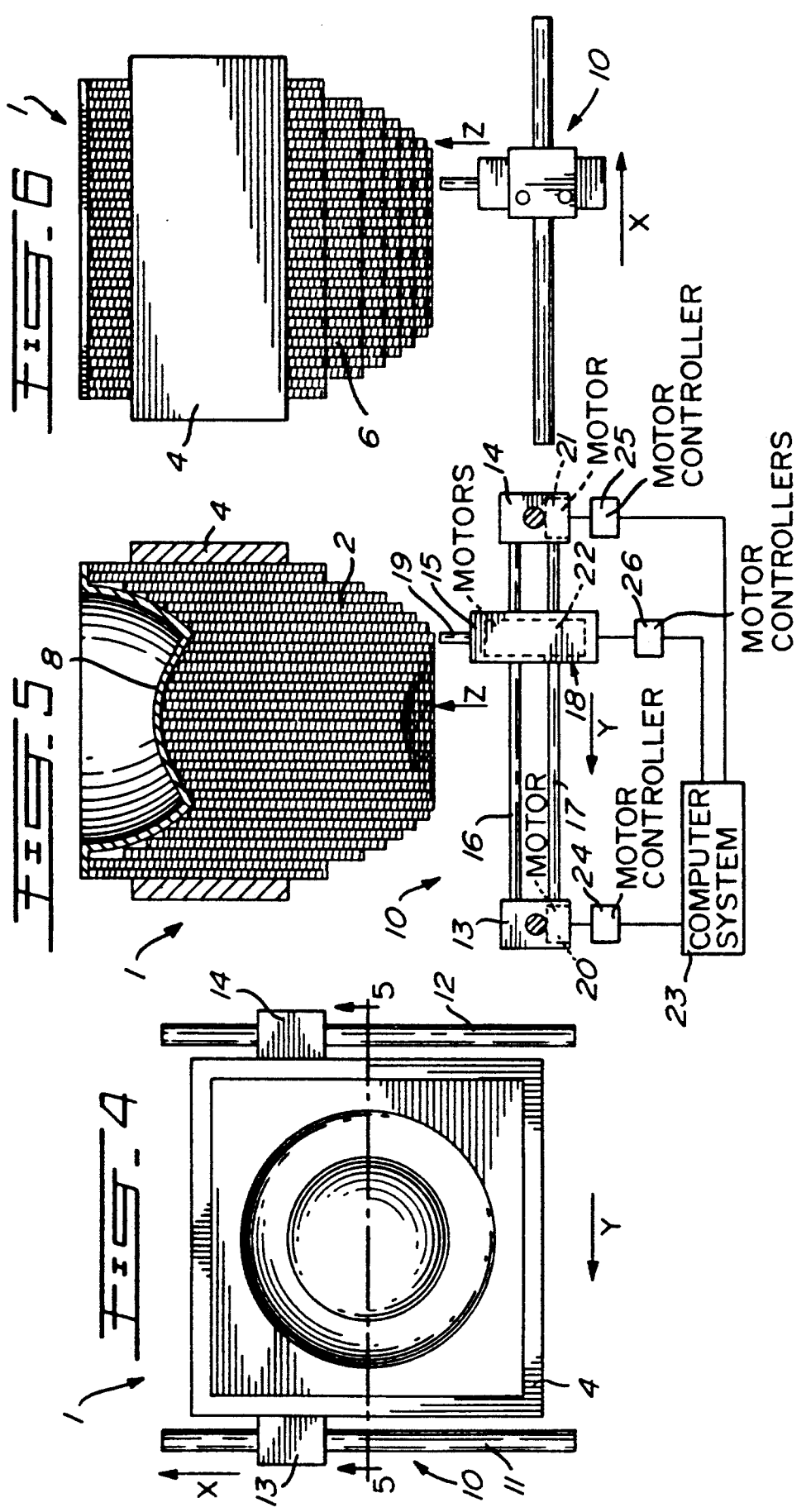

VARIABLE-SHAPE MOLD

BACKGROUND OF THE INVENTION

1. Field of the Invention

The present invention relates to a device for forming a variable-shape mold surface. It is within the scope of the present invention to digitally adjust the configuration of the mold surface through a computer system.

2. Brief Description of the Prior Art

In the industry of plastic and foam molding as well as in the foundries, models are currently used to fabricate molds. When intricate shapes are involved without requiring a great dimensional precision, these models are often made by craftsmen. Such models are costly and the delivery delay is of some weeks.

The manufacture of these models can also be automated by means of digitally controlled machining equipments. The drawback is that these equipments require complex and lengthy programs often overstepping their memory capacity. Also, machining by means of these equipments is very time-consuming. Finally, purchase and operation of such equipments involve high costs.

Moreover, in a research and development project, many versions of the same model are often required. Craft or digitally controlled manufacture of models are both time-consuming and costly.

Canadian patent $N^0$ 938,173 granted to the Ford Motor Company of Canada, Limited on Dec. 11, 1973 discloses a solution to the above problem. More specifically, this document describes a method of constructing mold surfaces by means of a bundle of laterally adjacent hexagonal rods. In accordance with this method, the hexagonal rods are precut at given lengths and angles, and are thereafter assembled together to form the bundle. Obviously, each rod must be placed in a predetermined position in the bundle to form the desired mold surface shape. The drawback of this prior art method is that the configuration of the mold surface is permanent and cannot be modified.

U.S. Pat. No. 2,968,838 (Hicks) issued on Jan. 24, 1961 also proposes the use of a bundle of laterally adjacent rods to imprint on a generally planar surface an image having a tridimensional appearance. These rods have a square cross section. They are slid longitudinally to enable machining thereof at one end. The shaped ends are then replaced in coplanar relationship to form a planar die. The rods are then assembled permanently into a bundle. Again, the disadvantage is that the pattern of the die is permanent.

OBJECTS OF THE INVENTION

An object of the present invention is therefore to provide a device for forming a variable-shape mold surface by means of a bundle of laterally adjacent rods.

Another object of the present invention is a device capable of forming the mold surface by adjusting the longitudinal position of the rods through a digitally controlled tool.

SUMMARY OF THE INVENTION

In accordance with the present invention, there is provided a device for forming a variable-shape mold surface, comprising (i) a plurality of rods each having a longitudinal axis and a mold surface defining end, and (ii) means for assembling the rods into a bundle of laterally adjacent rods in which the mold surface defining ends of the rods define the variable-shape mold surface. The rods also comprise means for both (i) enabling each rod to move longitudinally relative to the adjacent rods and (ii) locking each rod in longitudinal position on the adjacent rods. Each rod can therefore be moved longitudinally relative to the adjacent rods to impart axial movement to its mold surface defining end, and locked in longitudinal position on the adjacent rods in order to adjust as desired the configuration of the variable-shape mold surface.

The features of moving longitudinally the rods relative to each other and of locking in longitudinal position each rod on the adjacent rods enable modification of the configuration of the mold surface as desired.

The present invention also relates to a device for forming a variable-shape mold surface, comprising a plurality of cylindrical and helically threaded rods each having a longitudinal axis and a mold surface defining end, and means for assembling these rods into a bundle of laterally adjacent rods. In the bundle, the helical thread of each rod is engaged with the helical threads of the adjacent rods, each rod is rotatable about its longitudinal axis, and the mold surface defining ends of the rods define the variable-shape mold surface. Upon rotation of one helically threaded rod about its longitudinal axis, the thread of this rod slides on the threads of the adjacent rods to impart longitudinal movement to the rod relative to the adjacent ones and therefore axial movement of the mold surface defining end of this rod, to thereby modify the configuration of the variable-shape mold surface.

Preferably, the helical thread of the rods has a substantially triangular cross section.

In accordance with a preferred embodiment of the device of the invention, the assembling means comprises (i) a generally rigid structure embracing the bundle of laterally adjacent rods, and (ii) a set of second threaded rods mounted on the inside of the embracing structure. The bundle comprises peripheral rods of which the helical threads are engaged with the threads of these second rods. The second rods may be fixedly secured, for example welded to the embracing structure.

In accordance with other preferred embodiments of the device of the invention:

- each rod comprises a second end opposite to its mold surface defining end, which second end being shaped for engagement thereof with a rod rotating tool;
- the rod rotating tool is motorized, and the motorized tool is moved relative to the bundle in a plane perpendicular to the longitudinal axes of the rods in order to enable this tool to successively engage the second ends of the rods and rotate these rods;
- the rod rotating tool comprises an elongated and rotatable shank (i) including a tip capable of engaging the second ends of the rods, and (ii) reciprocating longitudinally to engage and disengage this tip with the second ends of the rods; and
- reciprocation of the shank of the rod rotating tool and movement of the rod rotating tool in the plane are digitally controlled.

Preferably, the mold surface defining ends of the rods are covered by a flexible membrane applied to the mold surface defining ends by means of a vacuum.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a top plan view of a device for forming a variable-shape mold surface in accordance with the present invention, comprising a bundle of laterally adjacent threaded rods;

FIG. 2 is a bottom view of the mold surface forming device of FIG. 1;

FIG. 3 is a side elevational view of a group of laterally adjacent rods of the bundle of FIGS. 1 and 2;

FIG. 4 is a top plan view of a mold surface forming device according to the invention, comprising a bundle of laterally adjacent threaded rods and a system for digitally adjusting the configuration of the mold surface by modifying the longitudinal position of the rods in the bundle;

FIG. 5 is a cross sectional, front elevational view of the mold surface forming device taken along line sectional line 5—5 of FIG. 4; and FIG. 6 is a side elevational view of the mold surface forming device of FIGS. 4 and 5, comprising rods of different lengths.

DETAILED DESCRIPTION OF THE PREFERRED EMBODIMENT

The mold surface forming device in accordance with the present invention is generally identified by the reference 1 in the accompanying drawings.

The device 1 first comprises a bundle of laterally adjacent cylindrical and helically threaded rods such as 2 each having a longitudinal axis such as 3 (FIG. 3). The helically threaded rods 2, which are preferably made of plastic or metal, have the same diameter and their helical threads are identical. Preferably, the rods 2 have the same length (FIGS. 5 and 6).

In the bundle, the helical thread of each rod 2 engages the helical threads of the laterally adjacent rods (FIG. 3). For example, the helical thread of rod $2_1$ engages the helical threads of five laterally adjacent rods while the thread of rod $2_2$ engages the helical threads of six laterally adjacent rods 2, whereby a maximum density of rods is obtained while minimizing the empty spaces between these rods. As indicated in FIGS. 5 and 6, the rods 2 are parallel to axis Z of a tridimensional coordinate system.

The device 1 also comprises a holding box 4. Although a holding box 4 rectangular in cross section is shown in FIGS. 1, 2 and 4, other shapes can be envisaged. As an example, FIGS. 5 and 6 show the height of the holding box 4. Holding rods such as 50 parallel to the rods 2 are fixedly secured, for example welded to the inner face 6 of the holding box 4. The rods 50 are cylindrical and have the same diameter as the rods 2. Their helical threads are also identical to those of these rods 2. The helical threads of the peripheral rods such as $2_3$ of the bundle engage the helical threads of the adjacent holding rods 50. For assembling the helically threaded rods 2 into a bundle of laterally adjacent rods, the holding box 4 and rods 50 embrace the rods 2 and apply a pressure on these laterally adjacent rods. Engagement of the threads of the holding rods 50 with the threads of the peripheral rods $2_3$ ensure mechanical stability of the bundle of laterally adjacent rods 2.

The holding rods 50 may also be mounted to the box 4 while being rotatable about their respective longitudinal axes 3.

One can appreciate that the laterally adjacent rods 2 of the bundle are mutually supported through engagement of their respective threads. The rods 2 as well as the holding rods 50 are preferably threaded throughout their entire length to provide a more effective support for the bundle of rods 2.

Each rod 2 of the bundle has a mold surface defining end such as 7. The rods 2 also comprise a screwdriver end such as 9 opposite to their mold surface defining end 7. As shown in FIGS. 2 and 3, the screwdriver ends 9 are tapered and square in cross section. When the holding rods 50 are welded to the inner face 6 of the box 4, they comprise no screwdriver end as illustrated in FIG. 2.

When one rod 2 of the bundle rotates about its longitudinal axis 3, the adjacent rods 2 (and eventually 50) performs the function of a nut. Rotation of one rod 2 about its longitudinal axis 3 causes no rotation of the laterally adjacent rods 2 (and eventually 50) as the couple of retention produced by friction between a specific rod and the laterally adjacent non rotating rods is well higher than the driving couple caused by friction between this specific rod and the laterally adjacent rotating rod. Of course, the type of thread is advantageously selected in view of reducing the friction between the laterally adjacent rods. As illustrated in FIG. 3, a thread which is triangular in cross section is adequate.

As the laterally adjacent rods 2 of the bundle perform the function of a nut, rotation of one rod 2 will impart longitudinal movement to this rod to thereby cause axial movement of its mold surface defining end 7 upwardly or downwardly, depending on the direction of rotation. Therefore, the rods 2 can be rotated about their respective longitudinal axes 3 through their screwdriver ends 9 to thereby displace axially the ends 7 until the desired configuration of mold surface is obtained. Accordingly, the mold surface formed by the ends 7 of the rods 2 is a variable-shape mold surface. Preferably, the mold surface defining ends 7 are slightly rounded to make molding easier.

The configuration of the variable-shape mold surface is as precise as the diameter of the rods 2 is small. The diameter of the rods 2 can therefore be selected in function of the requirements of each specific application.

Molding can be carried out directly on the surface formed by the mold surface defining ends 7 of the rods 2. A flexible membrane 8 (FIG. 5) can also be applied on the ends 7 of the rods before the molding operation is carried out. This membrane will produce a more uniform mold surface and will protect the threads of the rods 2 against dust and molding material susceptible to subsequently impede rotation of these rods. A vacuum can be used to apply the membrane to the mold surface defining ends 7. Individual covering of the ends 7 of the rods 2 can also be contemplated.

After the molding operation, the longitudinal position of the rods 2 in the bundle can be readjusted to create a new configuration of mold surface.

Upon adjustment of the longitudinal position of the rods 2, it is very important to maintain a minimum length of contact between the threads of the adjacent rods 2 (and eventually 50). If this length of contact is not sufficient, the bundle of rods 2 will collapse. As an example, for a two feet wide bundle of rods 2 in which the rods are threaded over a length of 12 inches, positional adjustment in which all the mold surface defining ends 7 are situated between two parallel planes separated by a distance of 6 inches will produce adequate support.

FIGS. 4, 5 and 6 illustrate a table assembly 10 for moving a screwdriver 18 in the plane X-Y of the tridimensional coordinate system, in view of successively rotating the rods 2 of the cluster in view of adjusting the configuration of the variable-shape mold surface by means of the mold surface defining rod ends 7.

The table assembly 10 comprises a pair of horizontal and parallel spaced apart slide shafts 11 and 12 on which respective runners 13 and 14 are mounted. The runners 13 and 14 slide on the shafts 11 and 12, respectively, in both directions along axis X of the tridimensional coordinate system.

A pair of straight rods 16 and 17 interconnect the runners 13 and 14. As shown in FIG. 5, the rods 16 and 17 are lying in a plane parallel to the plane Y-Z. The body 15 of the screwdriver 18 is mounted on the rods 16 and 17 to slide in both directions along axis Y. The table assembly 10 therefore enables movement of the screwdriver 18 along both axes X and Y in the plane X-Y.

When the screwdriver 18 has been displaced in the plane X-Y to align a shank 19 thereof with the screwdriver end 9 of one rod 2, a clutch system (not shown) extends the shank 19 longitudinally in the direction of axis Z. As the free end of the shank 19 is formed with a cavity that is the complement of the screwdriver ends 9 of the rods 2, the free end of the shank 19 will engage the end 9 aligned therewith. The shank 19 is then rotated to rotate the rod 2 until its mold surface defining end 7 is positioned as required to form the mold surface of desired configuration. The clutch system then retracts the shank 19 (in the direction of axis Z) and the screwdriver 18 displaced in the plane X-Y for alignment with another end 9 or rod 2. This operation is repeated until the desired configuration of mold surface is obtained. Extension and retraction should also be carried out to adapt to the variation of longitudinal position of the rotated rod 2.

Sliding of the runners 13 and 14 in both directions along the shafts 11 and 12, sliding of the screwdriver 18 in both directions along the rods 16 and 17, and extension, retraction and rotation of the shank 19 of the screwdriver 18 are motorized and the different motors 20, 21 and 22 (FIG. 5) are digitally controlled by means of a computer system 23 through the motor controllers 24, 25 and 26.

In operation, the position of the end 7 of each rod 2 is first calculated from a CAD (Computer Aided Design) drawing or from measurements made on a physical model. These data are then programmed into the computer system 23. Adjustment of the configuration variable-shape mold surface is then completely automated and a great variety of shapes can be easily obtained.

It is believed to be within the capacity of one of ordinary skill in the art to design and construct a screwdriver 18 performing the above functions, motorized mechanisms for moving the runners 13 and 14 on the shafts 11 and 12 and the screwdriver 18 on the rods 16 and 17, and a computer system for digitally controlling movement of these screwdriver and mechanisms. Accordingly, the structure and operation of these elements will not be further described in the present specification.

As an example, the computer system 23 may comprise a plurality of memory locations, each storing the position, in the tridimensional coordinate system X, Y and Z, of each threaded rod 2 for a desired configuration of mold surface. These data can be stored through different methods including manual programming of the longitudinal position of each rod 2, computerized interpretation of mathematical functions, computerized conversion of CAD drawings, and direct reading of the configuration of physical models by means of shape reading instruments.

Of course, several screwdrivers can be used to rotate the rods and form the mold surface of desired configuration.

The mold surface can be used to mold pieces of plastic and foam material and to cast metal pieces in foundries. More generally, the variable-shape mold surface is usable with any material, composite or not, that can be molded, cast or applied layer by layer and having a temperature of molding, of casting or of application sufficiently low to prevent damage to the ends 7 of the rods 2, the membrane 8 or the individual covering of the rod ends 7.

Although the present invention has been described hereinabove by way of a preferred embodiment thereof, this embodiment can be modified at will, within the scope of the appended claims, without departing from the spirit and nature of the present invention.

What is claimed is:

1. A device for forming a variable-shape mold surface, comprising a plurality of cylindrical and helically threaded rods each having a longitudinal axis and a mold surface defining end, and means for assembling said rods into a bundle of laterally adjacent rods in which (a) the helical thread of each rod is engaged with the helical threads of the adjacent rods, (b) each rod is rotatable about its longitudinal axis, and (c) said mold surface defining ends of the rods define said variable-shape mold surface, whereby, upon rotation of one of said helically threaded rods about its longitudinal axis, the thread of said one rod slides on the threads of the adjacent rods to impart longitudinal movement to said one rod relative to the adjacent rods and therefore axial movement of the mold surface defining end of said one rod, to thereby modify the configuration of the variable-shape mold surface.

2. A device as recited in claim 1, wherein the helical thread of said rods has a substantially triangular cross section.

3. A device as recited in claim 1, wherein said assembling means comprises (a) a generally rigid structure embracing said bundle of laterally adjacent rods, and (b) a set of second threaded rods mounted on the inside of said embracing structure, said bundle comprising peripheral rods of which the helical threads are engaged with the threads of said second rods.

4. A device as recited in claim 3, in which said second rods are fixedly secured to said embracing structure.

5. A device as recited in claim 4, in which said second rods are welded to said embracing structure.

6. A device as recited in claim 1, wherein each of said rods comprises a second end opposite to its mold surface defining end, said second end being shaped for engagement thereof with a rod rotating tool.

7. A device as recited in claim 6, wherein said rod rotating tool is movable and wherein said device further comprises means for digitally controlling movement and operation of said rod rotating tool to rotate successively said helically threaded rods in view of adjusting the configuration of said variable-shape mold surface.

8. A device as recited in claim 6, wherein said rod rotating tool is motorized, and wherein said device further comprises means for moving said motorized tool relative to said bundle of rods in order to enable said tool to successively engage said second ends of the rods and rotate said rods about their respective longitudinal axes to thereby adjust the configuration of said variable-shape mold surface.

9. A device as recited in claim 8, wherein said rod rotating tool comprises an elongated and rotatable shank (a) including a tip capable of engaging said second ends of the rods, and (b) reciprocating longitudinally to engage and disengage said tip with the second ends of the rods.

10. A device as recited in claim 9, further comprising means for moving said rod rotating tool into a plane perpendicular to the longitudinal axes of said rods.

11. A device as recited in claim 10, comprising means for digitally controlling reciprocation of the shank of the rod rotating tool and movement of the rod rotating tool in said plane.

12. A device as recited in claim 1, wherein said mold surface defining ends of the rods are covered by a flexible membrane.

13. A device as recited in claim 12, in which said flexible membrane is applied to said mold surface defining ends by means of a vacuum.

* * * * *